Aug. 17, 1926.  
J. W. BISHOP  
MOTOR  
Filed Sept. 29, 1921  
1,596,793  
3 Sheets-Sheet 1
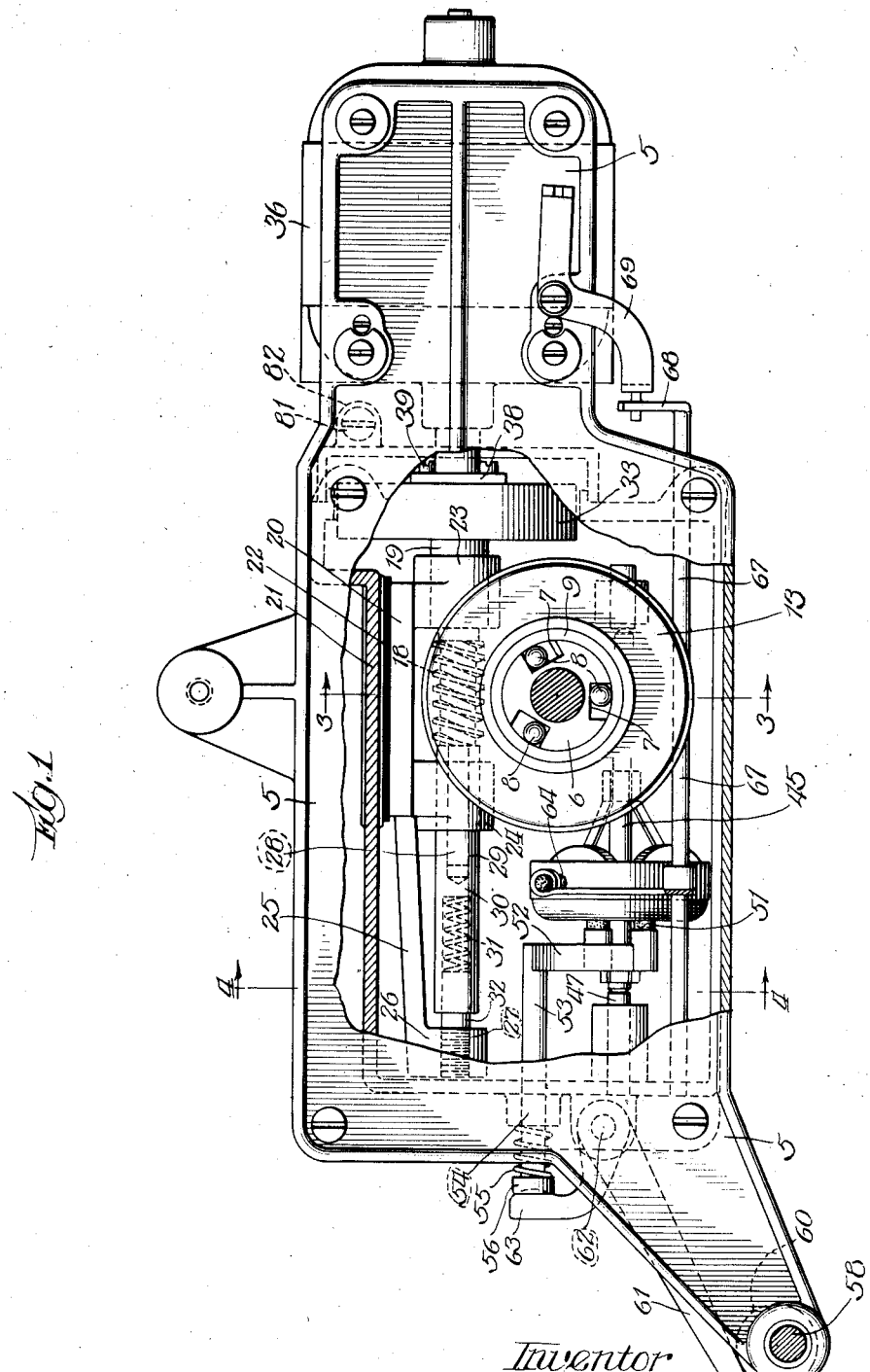

Aug. 17, 1926. 1,596,793
J. W. BISHOP
MOTOR
Filed Sept. 29, 1921 3 Sheets-Sheet 2
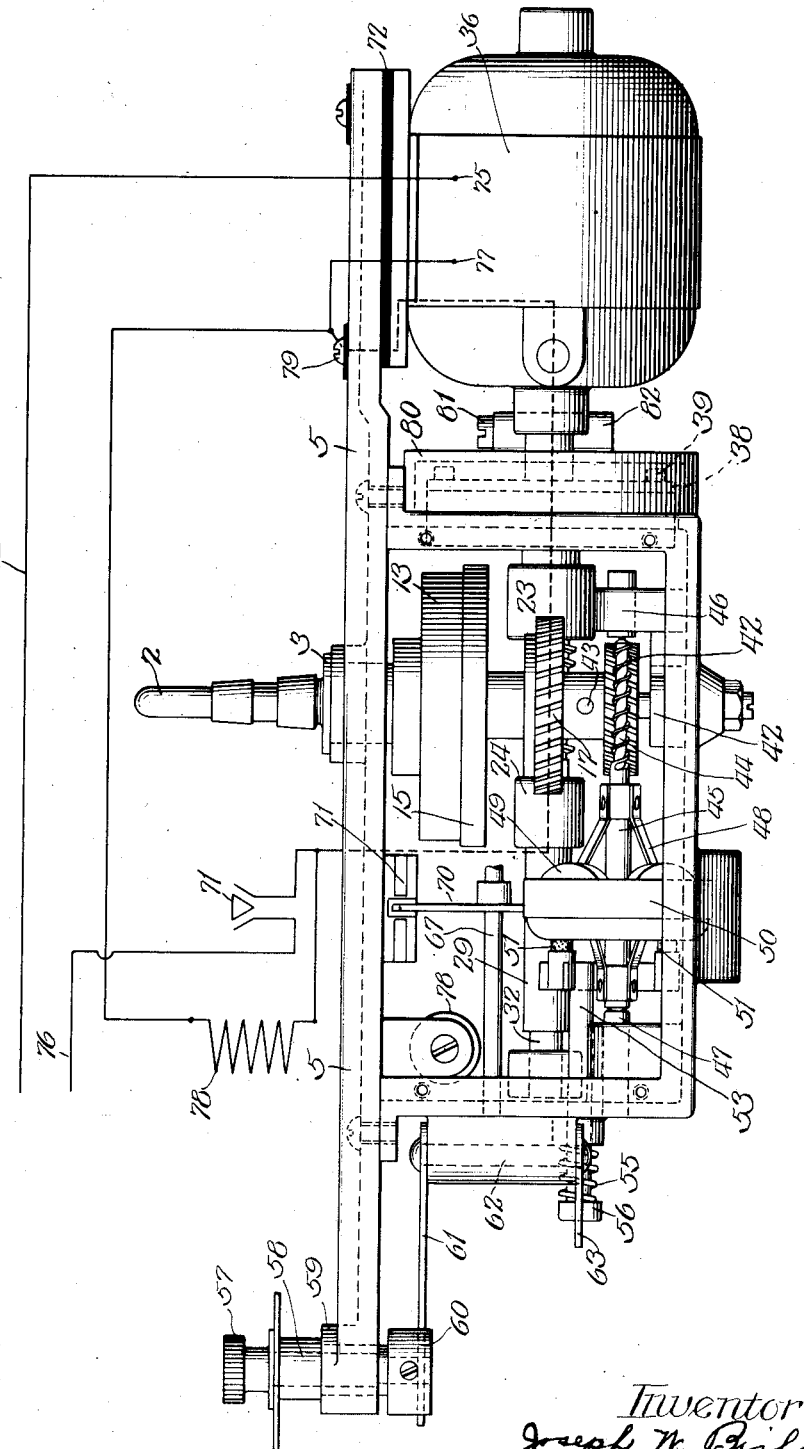
Inventor
Joseph W. Bishop
Wm O Best
Atty.

Aug. 17, 1926.  1,596,793
J. W. BISHOP
MOTOR
Filed Sept. 29, 1921  3 Sheets-Sheet 3
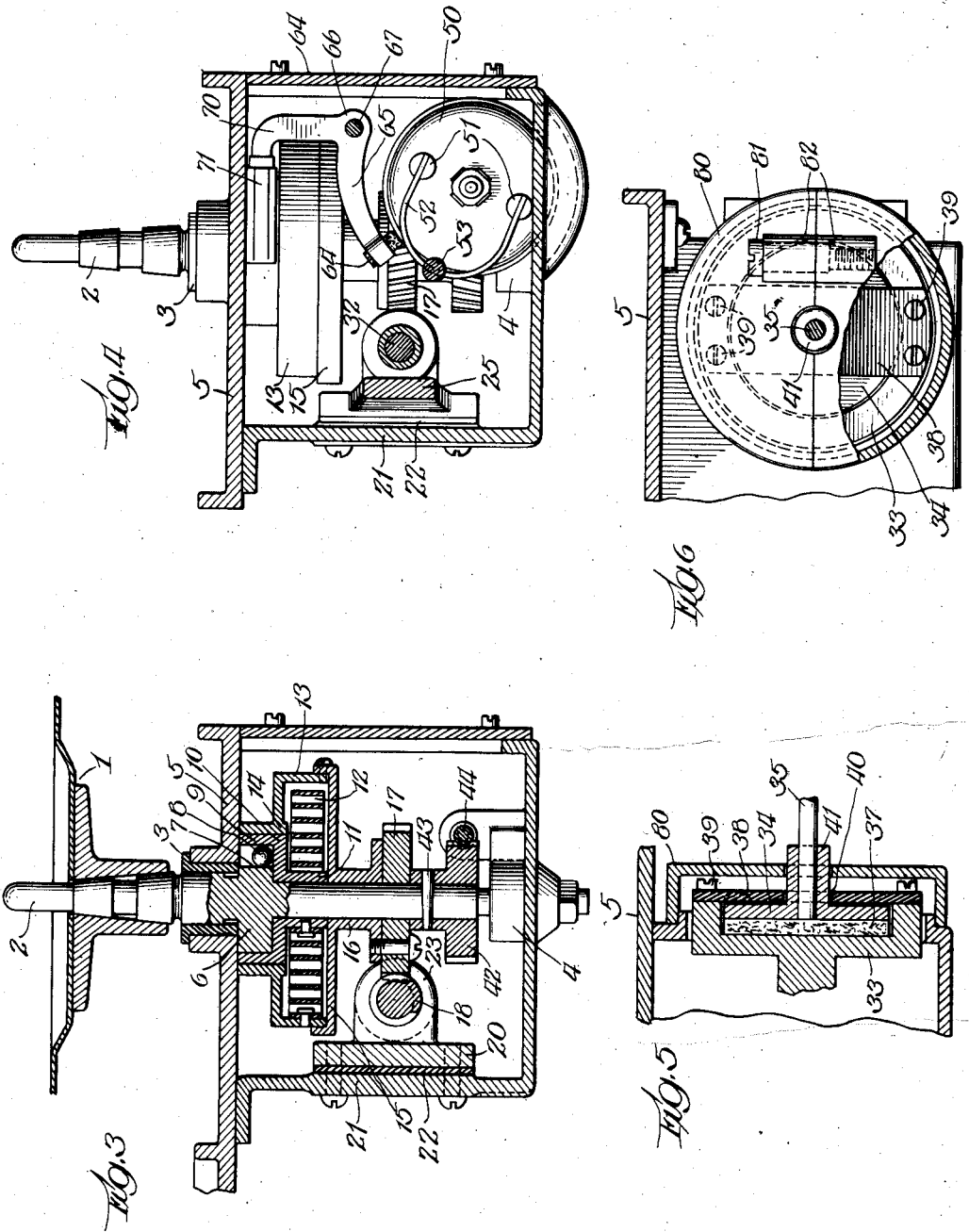
Inventor
Joseph W. Bishop
By Wm. O. Beet Atty.

Patented Aug. 17, 1926.

1,596,793

UNITED STATES PATENT OFFICE.

JOSEPH W. BISHOP, OF MUSKEGON, MICHIGAN, ASSIGNOR TO THE BRUNSWICK-BALKE-COLLENDER COMPANY, OF CHICAGO, ILLINOIS, A CORPORATION OF DELAWARE.

MOTOR.

Application filed September 29, 1921. Serial No. 504,097.

This invention relates to phonographs and has for its principal object to provide mechanism whereby the turn table may be driven at a constant speed by a motor having a variable speed.

Another and a more specific object of the invention is to provide means enabling an electric motor whose speed varies with the fluctuations in the line to drive the table of the phonograph at a constant speed.

Another object of the invention is to provide a driving connection between the turn table and the transmission gearing that will permit the table to be freely rotated by hand in either direction.

Further objects of the invention will become apparent as the description is read in connection with the accompanying drawing wherein I have shown a selected embodiment by way of illustration and in which—

Fig. 1 is a plan view with certain portions of the casing for driving mechanism broken away;

Fig. 2 is a side elevation with a portion of the housing removed and indicating the wiring diagram;

Fig. 3 is a transverse section on the line 3—3 of Fig. 1;

Fig. 4 is a transverse section on the line 4—4 of Fig. 1;

Figs. 5 and 6 are longitudinal section and end elevation respectively of the clutch between the motor and the transmission.

Referring to the reference characters on the drawing 1 indicates the turn table on which the record is carried. This table is mounted on the spindle 2 in the usual, or any suitable manner, and the spindle is journalled in the bushing 3 and the thrust bearing 4 carried by the motor frame, or any other manner desired. Just below the top plate 5 the spindle 2 is equipped with a flange 6 having therein a plurality of inclined seats 7 adapted to receive balls or rollers 8. The flange 9 of a bushing 10 surrounds the flange 6 and forms with the balls and the inclined faces of the notches, a clutch of familiar operation. The extension 11 of the bushing 10 is secured to the inner end of the spiral spring 12 having its outer end fastened to the cylindrical casing 13 which latter has a cylindrical hub 14 telescoping with the flange 9 and is rigidly secured to the disc 15 having the hub 16 journalled on spindle 2 and equipped with the worm gear 17 meshing with the worm 18 carried by the horizontal shaft 19. The shaft 19 is carried by a bracket 20 secured to the side 21 of the casing and insulated therefrom by the fiber or other non-conducting strip 22. The bracket 20 is equipped with the cylindrical bearings 23 and 24 and has an arm 25 terminating in a head 26 provided with a threaded opening 27 in alignment with the shaft 19. The bearing 23 receives the shaft 19 directly while the opposite end of the shaft is reduced as shown at 28 and journalled in a sleeve 29 carried by the bearing 24 and having a partition 30 forming a bearing for one end of the spring 31 which is compressed by a screw 32 threaded into the socket 27. The opposite end of the shaft 19 is equipped with a cup-shaped clutch member 33 (Fig. 5) which is adapted to receive the complemental clutch member 34 secured to the shaft 35 of the motor 36. The clutch member 34 is faced with a disc 37 of carbon, copper or other suitable material so that it will not only transmit torque but will provide an effective connection for transmission of electric current. A strip of rubber 38 is secured to the clutch member 33 by screws 39 and has an opening 40 for the hub 41 of the clutch member 34. Below the worm gear 17 the spindle 2 is equipped with a second worm gear 42 secured thereto by a pin 43 or any other suitable manner and meshing with the worm 44 on the governor shaft 45 which is journalled in the bearings 46 and 47 in any suitable manner. The governor is of familiar ball type having the springs 48 carrying the weights 49 and is equipped with a drum 50 adapted to move to the left in Fig. 2 as the speed of the spindle 2 increases to eventually bring the side of the drum 50 into contact with the brake pads 51 carried by the fork 52 (Fig. 4) which is fixed to the push rod 53 (Fig. 1) slidably mounted at 54 in the frame of the machine and urged away from the brake drum by a spring 55 compressed between the collar 56 on the rod 53 and the frame. The pads 51 are located in position to limit the speed of the motor as required. By turning the knob 57 (Fig. 2) carried by the shaft 58 journalled in the frame at 59 and equipped at 60 with an eccentric adapted to bear on the arm 61 of a bell crank lever pivoted at 62 and having a second arm 63 contacting with the collar 56 of the push rod 53, the position of the brake pads 51 may be adjusted to suit conditions. The brake 64 for stopping the turn table is carried by the arm 65 of a bell crank 66 carried by the shaft 67, (Figs. 1 and 4) having an arm 68 engaged with the control lever 69. The bell crank lever 66 has another arm 70 (Figs. 2 and 4) adapted to open a switch 71 when the brake is applied and to close the switch when the brake is released. The motor 36 is insulated from the frame by non-conducting substance 72 in a well understood manner.

The wiring diagram is indicated on Fig. 2. 74 is one side of the line connected to the motor at 75. 76 is the other side of the line connected to the switch 71 which is electrically connected with the worm shaft 19 through which the current passes as indicated in the dotted line and if the clutch shown in Fig. 5 is engaged, the current will pass through into the shaft 35 of the motor and then to the other binding post 77. A suitable resistance coil 78 is shunted between the binding post 79 and the switch 71 to prevent arcing in the clutch.

In operation, the control lever 69 is moved to release the brake 64 and close the switch 71. The spring 31 and the rubber strip 38 normally hold the clutch member 33 in contact with the carbon or copper disc 37. Consequently, the circuit is closed, the current is allowed to flow from one side 76 of the line through the switch 71, the shafts 19 and 35 and the motor 36, back to the opposite 74 side of the line 74. The motor 36 therefore drives the shaft 19 and the worm 18 communicates the rotary motion to the worm gear 17 which drives the bushing 10 through the spring 12, and through the clutch transmits motion to the spindle 2 carrying the table 1. An indicator is placed on the record table and the knob 57 is turned until the table is limited to the desired speed which is well within the capacity of the line under all ordinary conditions.

If the line builds up, the motor will accelerate and will tend to increase speed of the spindle 2 through the worm gearing, the helical spring 12 and the ball clutch. But an increase of torque on the worm increases its thrust against the spring 31 as well as the force applied to the spring 12; and, with properly adjusted and proportioned parts, the worm will be permitted sufficient movement to both relieve the clutch 33—34 and thus insert resistance in the circuit while spring 12 takes up the additional impulse, and the action of the governor brake and the inertia of the revolving parts prevent any perceptible increase in speed. Only a slight movement of the worm is sufficient to allow the clutch 33—34 to slip and thus to cut down the power to the motor 36. The result is that the device can be made so sensitive to an increase of torque from the motor 36 that will immediately relieve the clutch and thus reduce the current.

I have found it very satisfactory to make the spring 12 of sufficient length and power that is, under sufficient tension, to drive the table about ten revolutions without running down, but of course, springs of different length and strength may be used. This capacity is ample to provide the necessary absorption for the added torque and to supply sufficient impulse to drive the spindle during the intervals of interrupted drive from the motor. The spring 12 thus serves as a driving connection and also as an auxiliary motor.

The compression of spring 31 is adjusted by the screw 32 and by proper selection and adjustment this spring will be so sensitive to an increase of thrust on the worm that it will permit the circuit to be broken before any change in speed can be detected at the table.

In Figs. 5 and 6 I have shown the clutch housed by a suitable cap 80 made in two pieces and secured together by a bolt 81 passing through the bosses 82.

The clutch between the spindle 2 and the bushing 9 will permit the table to be freely rotated in one direction when the brake 64 is on, without putting any strain on the spring 12 or any other part of the mechanism, while rotation in the other direction merely winds the spring. When the spring is fast with respect to the spindle, it is a very easy matter to cause serious injury to the spring or to the other parts, or both, by rotating the table in the wrong direction.

I have shown a shoulder on the shaft 19 resting against the end of the sleeve 30, but it is to be understood that I may provide any suitable kind of thrust bearing instead.

The worm gears 17 and 42 are preferably made of fiber, bakelite, or the like, so as to be non-conducting as well as having the other desirable features of such material.

The resistance 78 is sufficient to prevent any arcing between the disc 37 and the clutch member 33, but is not so great as to preclude the passage of current sufficient to keep the motor running.

In normal operation of the device it will be understood that the longitudinal movement of the shaft 19 is very small, and does not continue through any great period of time. As a matter of fact, the intervals in which the circuit is broken by longitudinal movement of this shaft are very short and the corresponding intervals during which the motor is idling and the spring 12 is driving the table are likewise brief.

This intermittent action between the motor and the turn table is just sufficient to prevent the motor from increasing the speed of the turn table beyond the desired constant, and at the same time it does not permit the turn table to slow down below this constant.

I am aware that changes in the form, proportion and construction of the various parts may be made without departing from the spirit of the invention and I therefore reserve the right to make all such changes as may fairly fall within the scope of the following claims:

I claim:

1. In a phonograph, the combination of a motor, a spring having one of its ends operatively connected to the motor, a spindle, a record table carried by the spindle, and an overrunning clutch for transmitting motion from the spring to the spindle but permitting the spindle to rotate independently.

2. In a phonograph, the combination of a motor, a spiral spring, transmission gearing operatively connecting the motor to the spring, a rotatable record table, and an over-running clutch for transmitting motion from the spring to the record table but permitting the record table to rotate independently.

3. In a phonograph, the combination of a motor, a spiral spring, transmission gearing between the motor and the spring, a spindle, an over-running clutch for transmitting motion from the spring to the spindle, and a record table mounted on the spindle.

4. In a phonograph, the combination of a motor, a spindle, and transmission gearing between said motor and spindle including an overrunning clutch.

5. In a phonograph, a motor, a spindle, and transmission gearing between said motor and spindle including an auxiliary motor and an overrunning clutch.

6. In a phonograph, a motor, a spindle, and transmission gearing between said motor and spindle including an overunning clutch and a spring under tension, said spring serving as a driving connection and also as an auxiliary motor.

7. In a phonograph, a spindle, a gear loosely journaled thereon, means for driving said gear, a helical spring surrounding said spindle and connected to said gear, and a clutch connected to said spring and said spindle for the purpose set forth.

8. In a phonograph, a spindle, a gear loosely journaled thereon, a helical spring surrounding the spindle and under tension, said spring connected to said gear, and an overrunning clutch connected to said spring and to said spindle, whereby said spring acts as a driving connection and as an auxiliary motor, and whereby said spindle may be rotated independently.

JOSEPH W. BISHOP.